US009102252B2

(12) United States Patent
Sugiyama et al.

(10) Patent No.: US 9,102,252 B2
(45) Date of Patent: Aug. 11, 2015

(54) VEHICLE SEAT DEVICES

(75) Inventors: Shinji Sugiyama, Tochigi-ken (JP); Masato Kikuchi, Tochigi-ken (JP); Haruki Mochizuki, Tochigi-ken (JP); Shuto Yoshiuchi, Guangzhou (CN); Nobukazu Kikuchi, Utsunomiya (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 13/819,791

(22) PCT Filed: Aug. 31, 2011

(86) PCT No.: PCT/JP2011/069693
§ 371 (c)(1),
(2), (4) Date: Feb. 28, 2013

(87) PCT Pub. No.: WO2012/029821
PCT Pub. Date: Mar. 8, 2012

(65) Prior Publication Data
US 2013/0169010 A1   Jul. 4, 2013

(30) Foreign Application Priority Data

Sep. 2, 2010   (JP) ................................. 2010-196701

(51) Int. Cl.
*B60N 2/427* (2006.01)
*B60N 2/22* (2006.01)
(Continued)

(52) U.S. Cl.
CPC *B60N 2/427* (2013.01); *B60N 2/22* (2013.01); *B60N 2/42745* (2013.01); *B60N 2/449* (2013.01); *B60N 2/4415* (2013.01); *B60N 2/5858* (2013.01); *B60N 2/66* (2013.01)

(58) Field of Classification Search
CPC .. B60N 2/4415; B60N 2/449; B60N 2/42745; B60N 2/66
USPC .................. 297/248.9, 284.1, 216.13, 216.14
See application file for complete search history.

(56) References Cited

U.S. PATENT DOCUMENTS 2,822,034 A    2/1958  Dixon
4,500,136 A *  2/1985  Murphy et al. ............ 297/284.9
(Continued)

FOREIGN PATENT DOCUMENTS

DE   10 2006 037 521 A1   5/2007
DE   10 2009 044 817 A1   7/2010
(Continued)

OTHER PUBLICATIONS

Extended European Search Report dated Feb. No. 3, 2014 issued over the corresponding EP Patent Application No. 11821836.1.

*Primary Examiner* — David R Dunn
*Assistant Examiner* — Tania Abraham
(74) *Attorney, Agent, or Firm* — Carrier Blackman & Associates, P.C.; William D. Blackman; Joseph P. Carrier

(57) ABSTRACT

Vehicle seat devices are provided with: a backrest; side supports that are disposed on both sides of the backrest, and that have protruding sections that protrude further forward than the backrest; a mechanism for adjusting the degree of restraint that changes the width of the protruding sections; a frame disposed inside the side supports; and a movable member that is disposed on the frame, and that displaceably holds the ends of a side surface leather material of the side supports in relation to the frame.

11 Claims, 9 Drawing Sheets

(51) Int. Cl.
*B60N 2/44* (2006.01)
*B60N 2/66* (2006.01)
*B60N 2/58* (2006.01)

(56) References Cited

U.S. PATENT DOCUMENTS

| | | | | |
|---|---|---|---|---|
| 4,536,030 | A | * | 8/1985 | Sakurada et al. ........... 297/284.9 |
| 4,636,000 | A | * | 1/1987 | Nishino ...................... 297/284.9 |
| 5,280,997 | A | * | 1/1994 | Andres et al. .............. 297/284.9 |
| 5,975,633 | A | * | 11/1999 | Walk et al. ................. 297/284.9 |
| 6,068,336 | A | * | 5/2000 | Schonauer ................. 297/284.9 |
| 6,129,419 | A | * | 10/2000 | Neale .......................... 297/284.4 |
| 7,490,899 | B2 | * | 2/2009 | McMillen ................... 297/284.1 |
| 7,726,739 | B2 | * | 6/2010 | Wain ........................... 297/284.9 |
| 8,231,174 | B2 | * | 7/2012 | Yamada et al. ........... 297/284.11 |
| 2008/0136237 | A1 | | 6/2008 | Kayumi et al. |
| 2009/0026821 | A1 | * | 1/2009 | Macht et al. ............... 297/284.9 |
| 2009/0140569 | A1 | | 6/2009 | Mashimo |

FOREIGN PATENT DOCUMENTS

| | | |
|---|---|---|
| JP | 59-118451 U | 8/1984 |
| JP | 01-126145 U | 8/1989 |
| JP | 6-284942 A | 10/1994 |
| JP | 2008-143363 A | 6/2008 |
| JP | 2009-100924 A | 5/2009 |
| JP | 2010-279488 A | 12/2010 |
| WO | 2006/095455 A1 | 9/2006 |

* cited by examiner

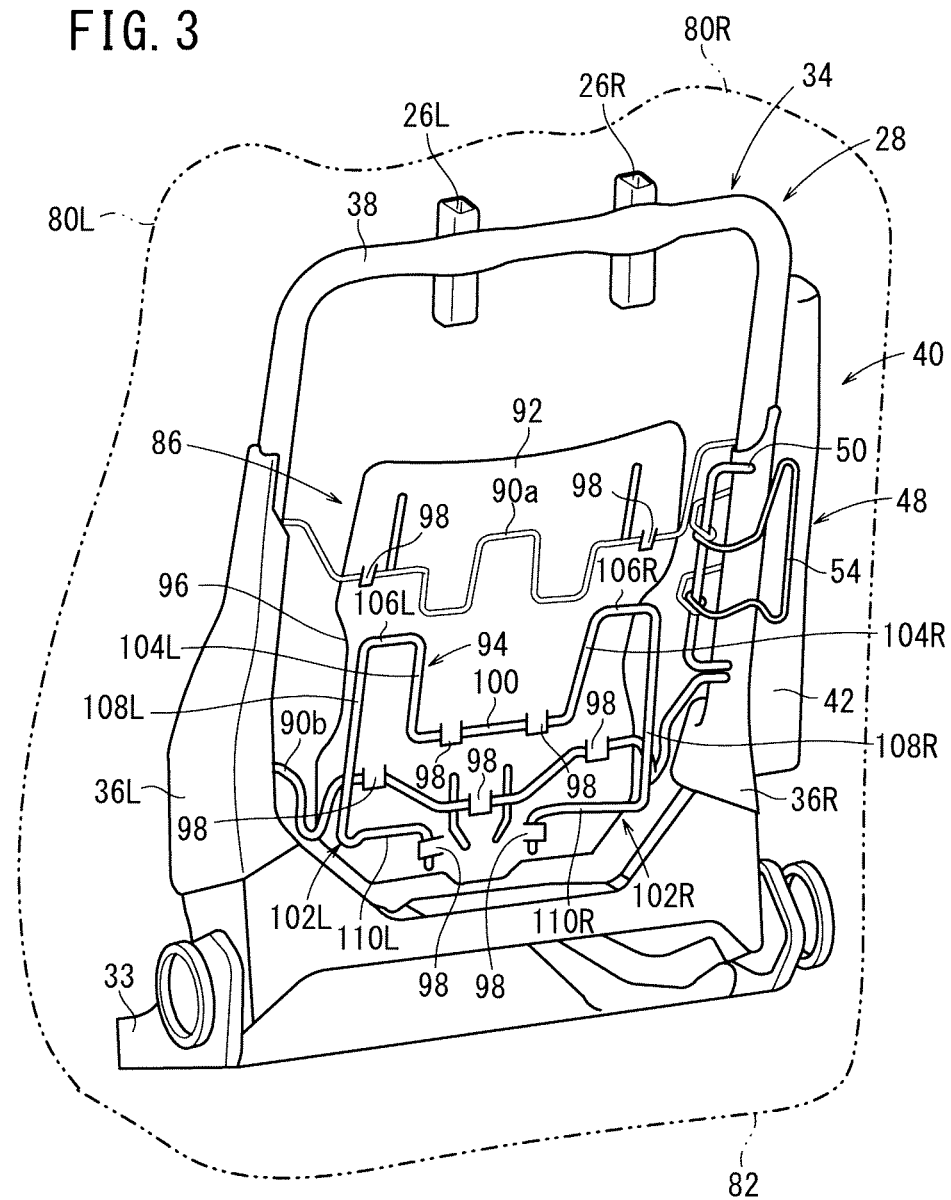
FIG. 3
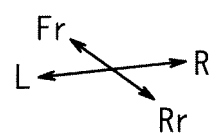

FIG. 6
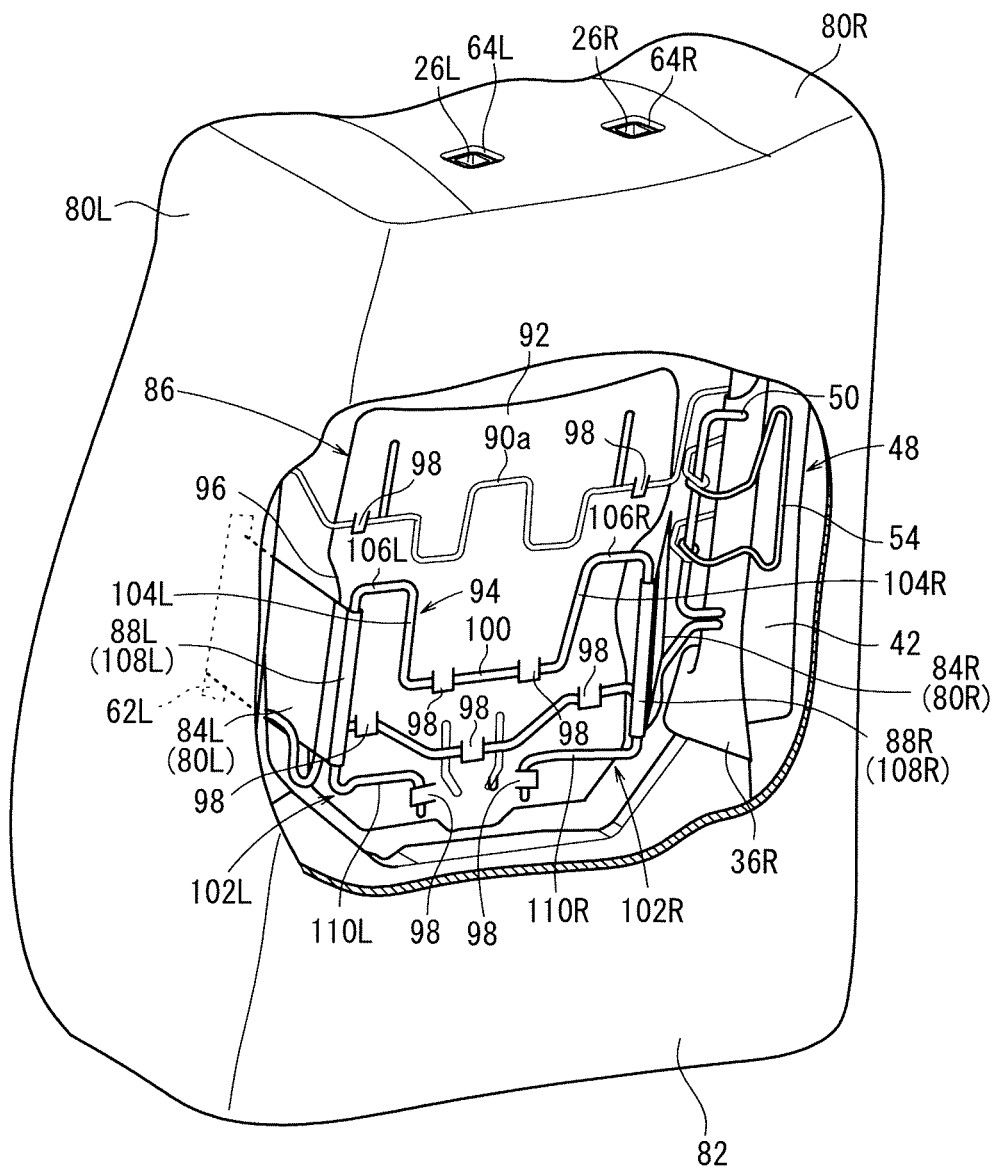
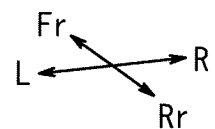

VEHICLE SEAT DEVICES

TECHNICAL FIELD

The present invention relates to a vehicular seat device (vehicular seat devices) having side supports on both sides of a backrest.

BACKGROUND ART

Heretofore, vehicular seat devices have widely been known, which include side supports on both sides of a backrest for restraining a passenger in a vehicle, in order to prevent the passenger from becoming tilted in attitude under centrifugal forces while the vehicle is traveling.

As one type of such a vehicular seat device, a vehicular seat device is disclosed in which portions (protruding portions) of side supports, which project forwardly from a backrest, have widths that are changed in order to enable the extent to which the passenger is restrained to be variable (Japanese Laid-Open Patent Publication No. 06-284942).

SUMMARY OF INVENTION

Usually, each of the side supports has an upholstery cover layer, an end portion of which is introduced into the side support (or the backrest) between the backrest and the side support. In this manner, the upholstery cover layer is fixed to a frame disposed in the side support while the upholstery cover layer is stretched sufficiently. Thus, the end portions of the upholstery cover layers are concealed from view, and surfaces of the side supports are prevented from becoming wrinkled.

If the above structure were applied to Japanese Laid-Open Patent Publication No. 06-284942, then the upholstery cover layers would tend to resist an attempt to increase the widths of the protruding portions. Therefore, the widths of the protruding portions could not be increased adequately, i.e., the distance between the protruding portions thereof could not be reduced sufficiently.

If the tension of the upholstery cover layers of the side supports is decreased in an effort to reduce the resistance imposed by the upholstery cover layers, if the width of the protruding portions is reduced, the surfaces of the side supports are likely to become wrinkled, thereby making the side supports aesthetically poor in appearance.

The present invention has been made in light of the aforementioned difficulties. An object of the present invention is to provide a vehicular seat device having protruding portions, the widths of which are variable to an increased extent, without making the protruding portions aesthetically poor in appearance.

According to the present invention, there is provided a vehicular seat device comprising a backrest, side supports disposed on respective sides of the backrest and having respective protrusions that project forwardly of the backrest, means for variably changing widths of the protrusions, a frame disposed in the side supports, and a movable assembly mounted on the frame, wherein the side supports include respective covering layers, respective ends of the covering layers being held by the movable assembly for displacement with respect to the frame (claim 1).

Preferably, the movable assembly is mounted on the frame for displacement in a thicknesswise direction of the backrest, and for bearing a rearward load applied to the backrest (claim 2).

Preferably, the movable assembly further comprises a pressure bearing member held in contact with the backrest, and a flexible member mounted on the pressure bearing member, wherein the ends of the covering layers of the side supports are engaged by the flexible member (claim 3).

Preferably, the vehicular seat device further comprises engaging members mounted respectively on the ends of the covering layers of the side supports, the engaging members extending in one direction, wherein the flexible member includes engaging wires that extend along a direction in which the backrest extends and which are engaged by the engaging members (claim 4).

Preferably, the vehicular seat device further comprises an airbag unit disposed in one of the side supports, the airbag unit being inflatable outwardly, a webbing disposed around the airbag unit, and a webbing support held by the frame and supporting the webbing, wherein the engaging wires are offset from the webbing support along the direction in which the backrest extends (claim 5).

Preferably, the pressure bearing member is shaped like a plate and includes a constricted portion, which is narrow in a widthwise direction of the backrest, and the engaging wires are disposed adjacent to the constricted portion (claims 6 and 7).

According to the invention recited in claim 1, since the ends of the covering layers of the side supports are displaceable with respect to the frame, when the widths of the protrusions are increased, the ends of the covering layers are displaced toward the protrusions, thereby pulling portions of the covering layers, which have been positioned in regions (within the side supports) that are concealed from view, onto the surfaces of the protrusions. Since resistance imposed from the covering layers when the widths of the protrusions are increased is reduced, the widths of the protrusions are capable of being changed to an increased extent.

When the widths of the protrusions are reduced, the ends of the covering layers are displaced in directions away from the protrusions, thereby pulling portions of the covering layers, which correspond to the protrusions, into the side supports. The surfaces of the side supports are thus prevented from wrinkling, and hence from becoming poor in appearance.

According to the invention recited in claim 2, when the driver on the vehicular seat device is subjected to a rearward load toward the backrest due to a vehicle collision or the like, the movable assembly bears the rearward load toward the backrest and displaces the backrest relatively in a rearward direction. Therefore, any impact on the driver is reduced.

If the ends of the covering layers of the side supports are fixed to the frame by fixed members, then if a vehicle collision occurs, such fixed members tend to interfere with other members that bear the load on the backrest, possibly preventing the backrest from being displaced relatively in a rearward direction. The vehicular seat device according to the present invention is free of such a drawback.

According to the invention recited in claim 3, when the widths of the protrusions are increased, the flexible member becomes elastically deformed, thereby displacing the ends of the covering layers of the side supports toward the protrusions. By reducing the widths of the protrusions, the ends of the covering layers are displaced in directions away from the protrusions under a recovering force from the flexible member.

In addition to the flexible member being elastically deformed, if the pressure bearing member also is displaced with respect to the frame, then it is possible for the ends of the covering layers to be displaced to an increased extent.

According to the invention recited in claim 4, since the engaging members, which extend in one direction, engage with the engaging wires, variation in the tension that acts on the covering layers along the direction in which the backrest extends is made smaller and more uniform than if the ends of the covering layers of the side supports were held on the flexible member by C-rings or the like.

According to the invention recited in claim 5, the airbag unit is disposed in one of the side supports, and the engaging wires are offset from the webbing support along the direction in which the backrest extends. Therefore, if the flexible member becomes elastically deformed, or if the pressure bearing member is displaced in the thicknesswise direction of the backrest, the webbing support and the flexible member are prevented from interfering with each other.

According to the invention recited in claim 6 or 7, since the engaging wires are disposed adjacent to the constricted portion, the engaging wires or the covering layers of the side supports can be disposed in spaces created on both sides of the constricted portion. Therefore, the movable assembly is rendered compact as a whole.

BRIEF DESCRIPTION OF DRAWINGS

FIG. 3 is a rear perspective view of a frame and a movable member according to the first embodiment;

FIG. 6 is a rear perspective view, partially cut away, of the seat back according to the first embodiment;

DESCRIPTION OF EMBODIMENTS

Figure 1:
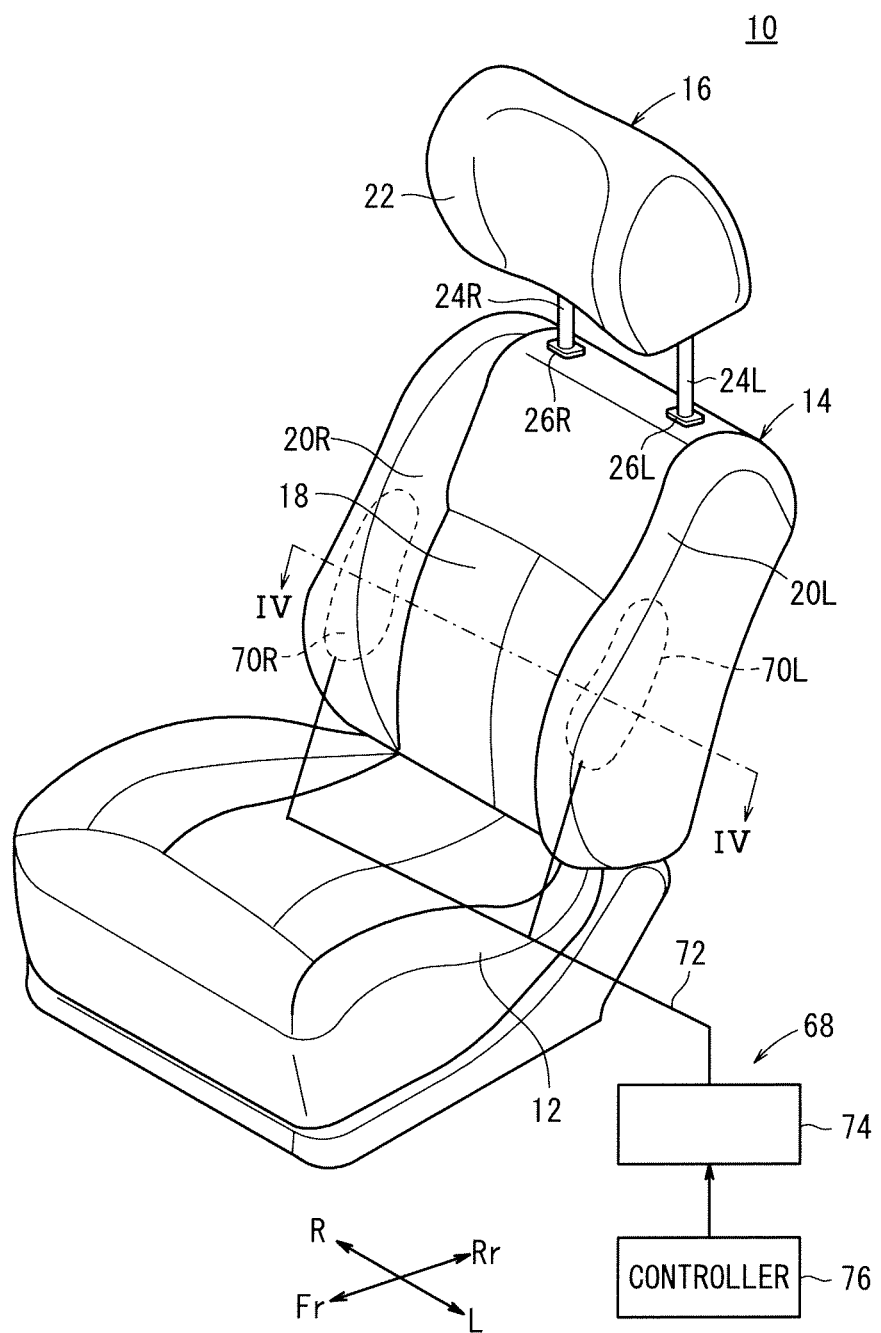
FIG. 1 is a perspective view of a vehicular seat device according to a first embodiment of the present invention.

Vehicular seat devices according to preferred embodiments of the present invention will be described in detail below with reference to the accompanying drawings. For facilitating understanding of the present invention, a left-hand side of a vehicular seat device as viewed from the perspective of a passenger seated on the vehicular seat device is denoted by the arrow "L", a right-hand side of the vehicular seat device is denoted by the arrow "R", a front side of the vehicular seat device is denoted by the arrow "Fr", and a rear side of the vehicular seat device is denoted by the arrow "Rr". (First Embodiment)

A vehicular seat device (first seat device) 10 according to a first embodiment of the present invention will be described below with reference to FIGS. 1 through 7. In the following description, when it is necessary to distinguish between left and right components, the components are denoted by reference characters together with a suffix "L" or "R". When the components do not need to be distinguished from each other, the components are denoted by reference characters alone without the appended suffixes.

The first seat device 10 may be used as a driver's seat for automobiles (vehicles), for example. As shown in FIG. 1, the first seat device 10 includes a seat cushion 12 mounted on a non-illustrated vehicle body for supporting the buttocks and thighs of the driver, a seat back 14 tiltably supported on the rear end of the seat cushion 12 for supporting the back of the driver, and a headrest 16 vertically and adjustably mounted on the upper end of the seat back 14 for supporting the head of the driver.

The seat back 14 has a backrest 18, which serves as a lateral central area of the seat back 14, and a pair of side supports 20L, 20R. The side supports 20L, 20R are disposed on respective left and right sides of the backrest 18. Each of the side supports 20 projects in a forward direction from the front surface of the backrest 18, and along a vertical direction in which the backrest 18 extends, so as to support a side of the driver.

The headrest 16 has a headrest body 22 and two stays 24L, 24R that extend in a downward direction parallel to each other from the lower end of the headrest body 22. The headrest 16 is mounted on the seat back 14, with the stays 24L, 24R being inserted in respective stay supports 26L, 26R on the upper end of the seat back 14.

Figure 2:
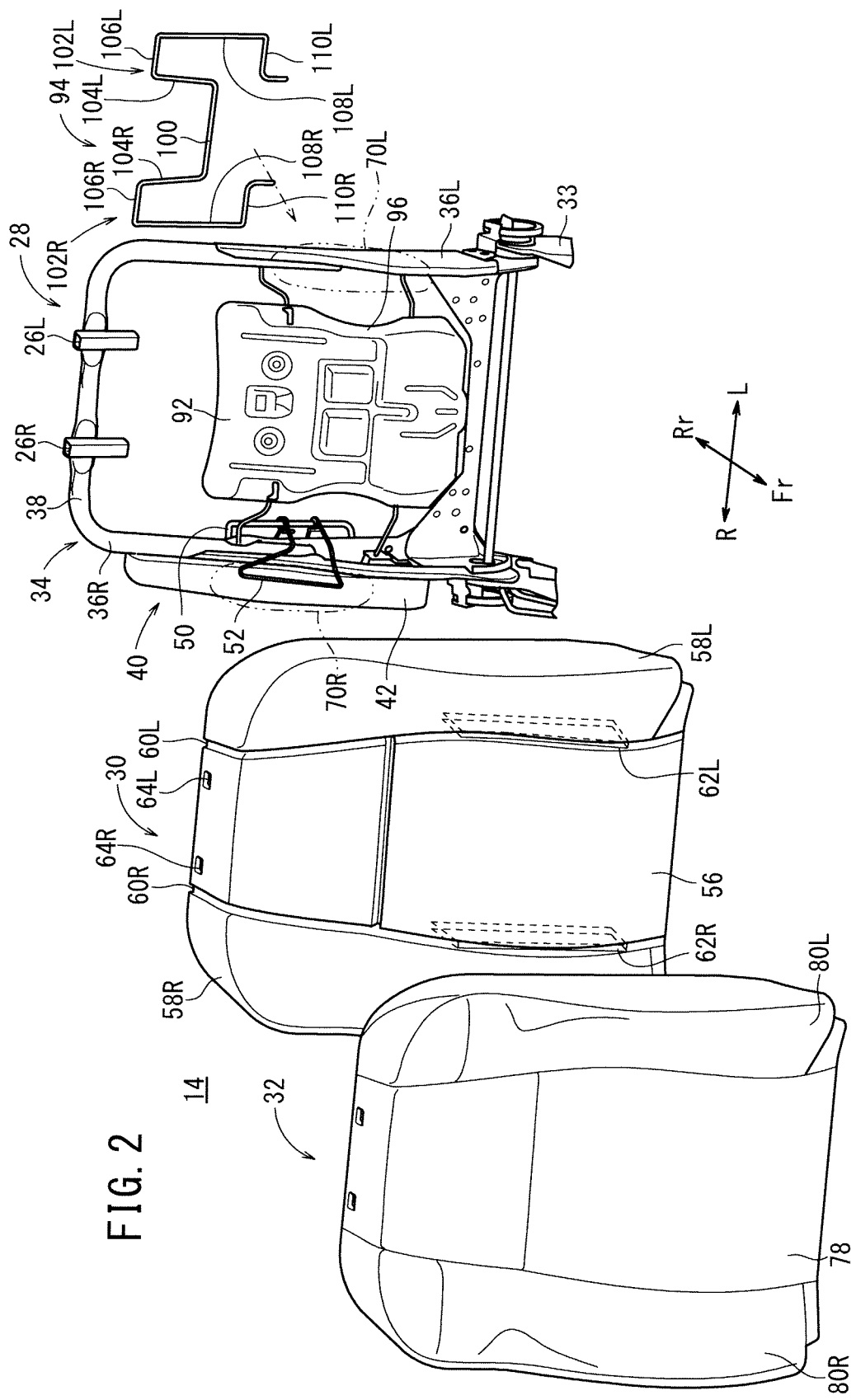
FIG. 2 is an exploded perspective view of a seat back according to the first embodiment.

As shown in FIG. 2, the seat back 14 includes a seat back frame 28, a back pad 30 covering the seat back frame 28, and an upholstery cover layer 32 covering the back pad 30.

As shown in FIGS. 2 and 3, the seat back frame 28 (hereinafter referred to as a "frame 28"), which serves as a skeleton of the seat back 14, is tiltably coupled to the rear end of a lower frame 33, which serves as a skeleton of the seat cushion 12, so that the frame 28 can be tilted back and forth. The frame 28 includes a main frame 34, which is substantially inversely U-shaped as viewed in front elevation.

The main frame 34 includes left and right side frame members 36L, 36R, and a top frame member 38 interconnecting upper portions of the side frame members 36L, 36R. The main frame 34 is made of a material, e.g., a metal material such as steel, aluminum, or the like, which is sufficiently rigid so as not to become deformed under loads.

The stay supports 26L, 26R, in which the stays 24L, 24R of the headrest 16 are inserted, are fixedly mounted on the top frame member 38. An airbag device 40 for protecting the driver upon the occurrence of a vehicle collision is mounted on a right-hand side of the side frame member 36R.

As shown in FIGS. 2 through 5, the airbag device 40 includes an airbag unit 42, which is capable of being inflated when a propellant is ignited therein, two webbings 46a, 46b (see FIGS. 4 and 5) that direct the inflating pressure of the airbag unit 42 toward a seam of the upholstery cover layer 32, which serves as a rupturable region 44, and a webbing support 48 for supporting the webbings 46a, 46b.

The webbing support 48 is mounted on a fixed frame member 50, which is disposed substantially in a longitudinally central location on the side frame member 36R. The fixed frame member 50 is positioned within the main frame 34. The webbing support 48 includes a front wire 52, which is positioned forwardly of the airbag unit 42, and a rear wire 54, which is positioned rearwardly of the airbag unit 42. Respective ends of the front wire 52 and the rear wire 54 are coiled around the fixed frame member 50.

Figure 4:
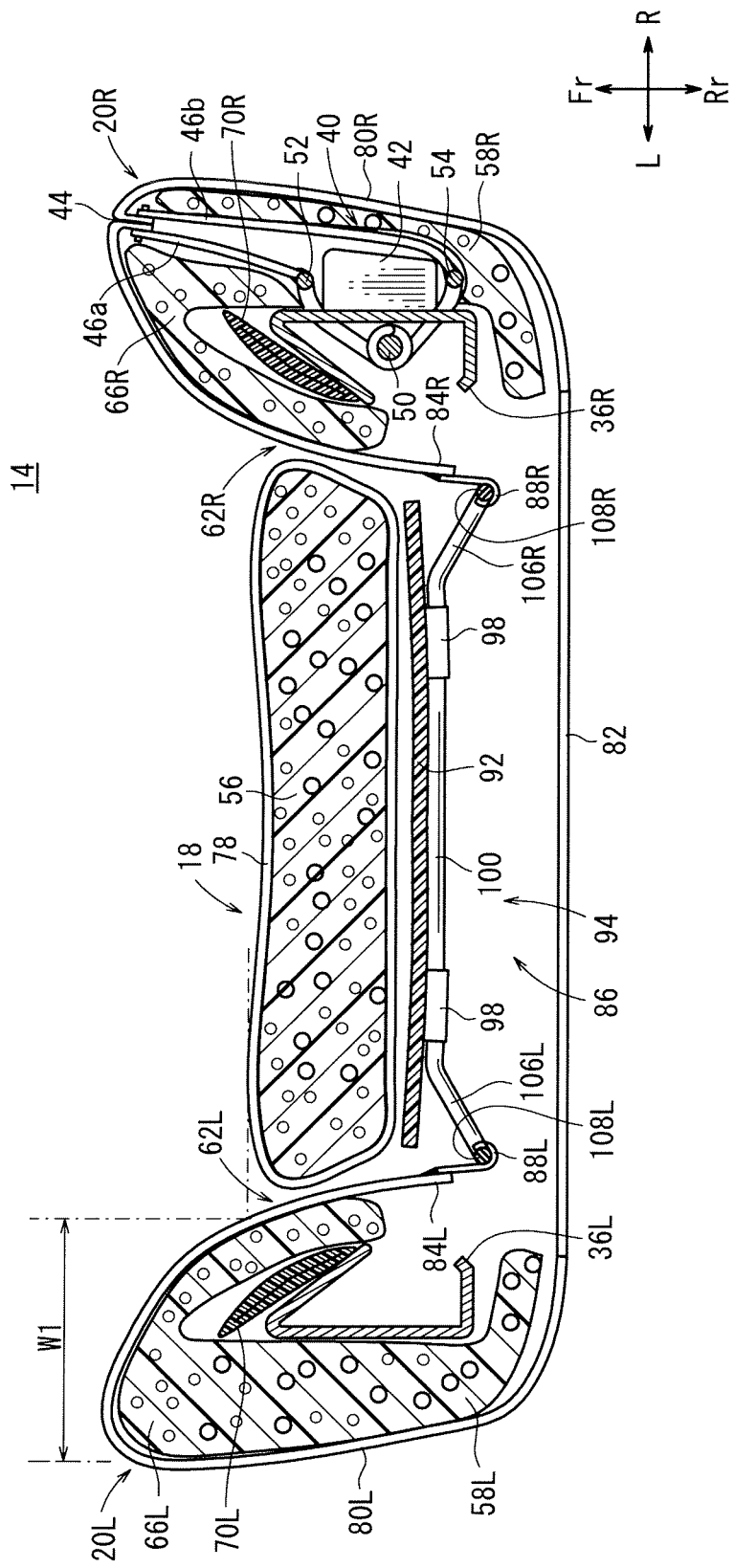
FIG. 4 is a cross-sectional view taken along line IV-IV of FIG. 1, showing air pouches in a collapsed condition.
Figure 5:
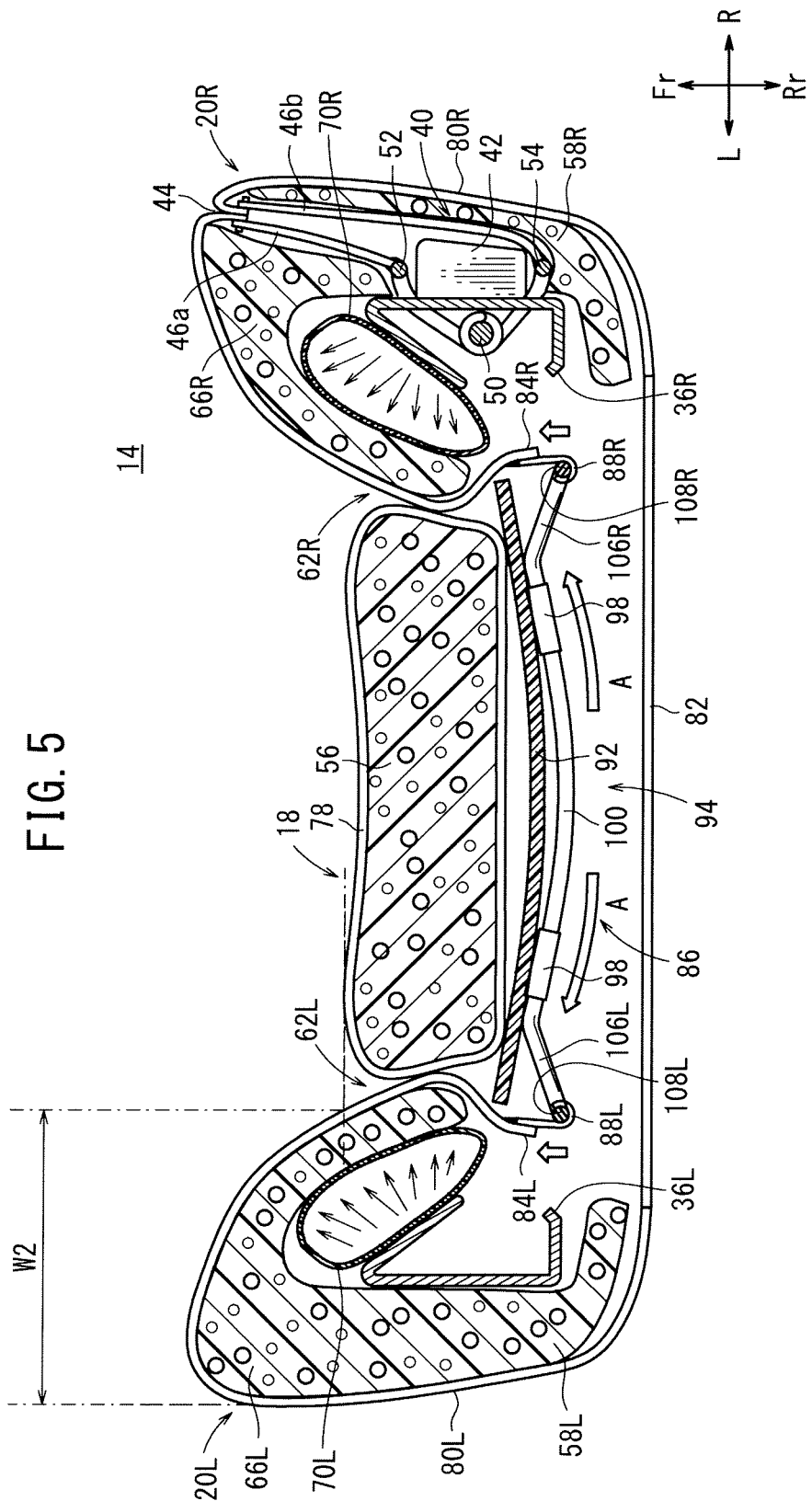
FIG. 5 is a cross-sectional view similar to FIG. 4, showing the air pouches in an expanded condition.

As shown in FIGS. 4 and 5, an end of one of the webbings 46a is held by the front wire 52, and an end of the other webbing 46b is held by the rear wire 54. The other ends of the two webbings 46a, 46b are stitched to the rupturable region 44 of the upholstery cover layer 32. Since the airbag unit 42 is covered with the side frame member 36R and the webbings

46a, 46b, an inflating pressure, which is generated upon inflation of the airbag unit 42, is directed toward the rupturable region 44.

As shown in FIGS. 2, 4 and 5, the back pad 30, which serves to produce the shape of the seat back 14, is made of an elastically deformable material such as soft polyurethane foam, for example. The back pad 30 includes a central pad 56, which is disposed in a lateral central position, and two side pads 58L, 58R, which are disposed on respective left and right sides of the central pad 56.

As shown in FIG. 2, the back pad 30 has two grooves 60L, 60R defined at respective boundaries between the central pad 56 and the side pads 58L, 58R. The grooves 60L, 60R include respective vertically extending slits 62L, 62R, which are defined through the back pad 30 and extend from a rear surface to a front surface of the back pad 30. Except for the slits 62L, 62R, the central pad 56 and the side pads 58L, 58R are joined together integrally at upper and lower portions thereof. The height of the slits 62 lies within a range from 12 cm to 40 cm, for example.

The central pad 56 has two insertion holes 64L, 64R, which are defined in an upper surface thereof for enabling insertion therein of the stay supports 26L, 26R on the upper end of the seat back 14. The insertion holes 64 extend vertically through an upper wall portion of the back pad 30.

As shown in FIGS. 4 and 5, the side pads 58L, 58R are disposed in covering relation to the side frame members 36L, 36R and have respective protrusions 66L, 66R that project forwardly from the front surface of the central pad 56. The side pads 58 are associated with a restraint adjusting mechanism 68 (see FIG. 1), which acts as a variable means for changing the width of the protrusions 66L, 66R.

As shown in FIG. 1, the restraint adjusting mechanism 68 includes two expandable and shrinkable air pouches (also referred to as "bladders" or "air cells") 70L, 70R (see FIGS. 4 and 5), which are disposed between the side frame members 36L, 36R and the side pads 58L, 58R, an air supply 74 for supplying compressed air through a tube 72 to the air pouches 70, and a controller 76 for controlling the air supply 74. The air supply 74 may comprise an air compressor or the like. The compressed air supplied to the air pouches 70 is discharged by exhaust valves or the like, not shown. The controller 76 may be incorporated in the vehicular seat device 10, or may be incorporated in an engine control unit (ECU) of the vehicle.

As shown in FIGS. 2, 4 and 5, the upholstery cover layer 32 includes a central cover layer 78 that covers the front and upper surfaces of the central pad 56, two side covering layers 80L, 80R that cover the respective side pads 58L, 58R, and a rear covering layer 82 that covers the rear surface of the central pad 56. The upholstery cover layer 32 as a whole covers the back pad 30 substantially in its entirety. The central cover layer 78 corresponds to front and upper surfaces of the backrest 18 of the seat back 14, whereas the side covering layers 80 correspond to the side supports 20 (see FIG. 1).

As shown in FIGS. 4 through 6, the side covering layers 80L, 80R include respective covering webs 84L, 84R, the widths of which are substantially the same as the height of the slits 62. The covering webs 84 extend rearwardly from locations corresponding to the slits 62, through the slits 62 and into the seat back 14. Respective ends of the covering webs 84 are held by a movable back support assembly 86 (also referred to as a movable assembly herein), which is displaceable with respect to the seat back frame 28. Engaging members 88L, 88R are fixed to respective ends of the covering webs 84L, 84R over the entire length thereof. The engaging members 88L, 88R are tubular in shape, and may also be referred to as engaging sleeve members.

As shown in FIGS. 2 through 6, the movable assembly 86 includes two support wires 90a, 90b connected to the side frame members 36L, 36R, a plate-shaped pressure bearing member 92 supported on the support wires 90a, 90b for bearing rearward loads applied to the backrest 18, and a flexible member 94, which is mounted on the rear surface of the pressure bearing member 92 and holds the engaging members 88.

As shown in FIGS. 3 and 6, the support wires 90a, 90b are disposed behind the pressure bearing member 92, and are joined to and extend between the side frame members 36L, 36R. The support wires 90a, 90b are flexible.

As shown in FIGS. 2 and 3, the pressure bearing member 92 has a narrow constricted portion 96 positioned substantially centrally in the vertical direction. As shown in FIGS. 4 and 5, the pressure bearing member 92 has upper and lower portions (other than the constricted portion 96), the width of which is substantially the same as the width of the central pad 56. As shown in FIGS. 3 and 6, the pressure bearing member 92 has a plurality of engaging teeth 98 on a back portion thereof, by which the pressure bearing member 92 is attached to the support wires 90a, 90b, and the flexible member 94 is attached to the pressure bearing member 92. The layout and number of the support wires 90a, 90b may be selected as desired. However, according to the present embodiment, the support wire 90a that is disposed on the upper portion of the pressure bearing member 92, and the support wire 90b that is disposed on the lower portion of the pressure bearing member 92 allow the pressure bearing member 92 to be supported in a well balanced manner.

As shown in FIGS. 2, 3 and 6, the flexible member 94 includes a laterally extending holding wire 100, which is held by the constricted portion 96, and two engaging wires 102L, 102R, which are joined to respective left and right sides of the holding wire 100 and hold the engaging members 88L, 88R. The flexible member 94 is laterally symmetrically shaped. The holding wire 100 and the engaging wires 102 are made of steel, for example, having a diameter in the range from 3 mm to 6 mm. The length of the holding wire 100 is about one-half the width of the constricted portion 96.

The engaging wires 102L, 102R include respective first wires 104L, 104R that extend from ends of the holding wire 100 toward the top frame member 38, second wires 106L, 106R that extend from ends of the first wires 104L, 104R toward the side frame members 36L, 36R, third wires 108L, 108R that extend from ends of the second wires 106L, 106R toward the lower frame 33, and fourth wires 110L, 110R that extend from ends of the third wires 108L, 108R inwardly of the main frame 34. End portions of the fourth wires 110 are held by the lower end of the pressure bearing member 92.

As shown in FIGS. 3 and 4, the second wires 106 extend obliquely rearward from the ends of the first wires 104, whereas the fourth wires 110 extend obliquely forward from the ends of the third wires 108. Therefore, a gap is defined in a front-rear direction between the third wires 108 and the pressure bearing member 92 through which the support wire 90b is inserted. Accordingly, the flexible member 94 and the support wire 90b are prevented from interfering with each other. Upper ends of the first wires 104 are positioned more closely to the lower frame 33 than to the webbing support 48 (see FIG. 3).

As shown in FIG. 6, the engaging members 88 are attached to the third wires 108 such that the side covering layers 80 are stretched adequately. Since the side covering layers 80 are placed under a predetermined tension, the surfaces of the side supports 20 are prevented from wrinkling.

As shown in FIG. 6, the third wires 108 are slightly longer than the engaging members 88. Therefore, any variation in tension that acts in a vertical direction on the side covering layers 80 is minimized, and the tension is more uniform than if the ends of the side covering layers 80 were held on the flexible member 94 by C-rings or the like.

Operations of the first seat device 10 to change the restraint will be described below.

As shown in FIG. 4, when the restraint imposed on the driver by the side supports 20 is small (compressed air is not present in the air pouches 70), the ends of the covering webs 84 are held on the third wires 108 by the engaging members 88 with the side covering layers 80 being stretched sufficiently. At this time, the surfaces of the side supports 20 are not wrinkled.

Then, as shown in FIGS. 1 and 5, the controller 76 controls the air supply 74 to supply compressed air to the air pouches 70. At this time, the pressure of the compressed air (the expanding pressure of the air pouches 70) acts on the protrusions 66 of the side pads 58. Thus, since the widths of the protrusions 66 are increased, the ends of the covering webs 84 are subjected to tensile forces toward the protrusions 66.

When the ends of the covering webs 84 are subjected to such tensile forces, the support wires 90a, 90b are elastically deformed in order to displace the flexible member 94 and the pressure bearing member 92 in a forward direction with respect to the frame 28 (see FIG. 6, for example).

Since moments act on the flexible member 94 in the directions indicated by the arrows A, the flexible member 94 is elastically deformed in an arcuate shape. Further, since the flexible member 94 is held on the pressure bearing member 92 by the engaging teeth 98, the pressure bearing member 92 also is elastically deformed in unison with the flexible member 94. As a result, the ends of the covering webs 84 are displaced toward the protrusions 66 until portions of the covering webs 84 are pulled onto the surfaces of the protrusions 66. Therefore, the widths of the protrusions 66 are increased while minimizing the resistance from the side covering layers 80. More specifically, as shown in FIGS. 4 and 5, the widths of the protrusions 66 grow from W1 to W2. Insofar as the distance between the protrusions 66L, 66R is reduced, the protrusions 66L, 66R produce increased forces that act to restrain the driver.

Thereafter, the controller 76 controls the exhaust valves to discharge compressed air from the air pouches 70. At this time, the air pouches 70 shrink, thereby reducing the widths of the protrusions 66. Since the tensile forces that have been acting on ends of the covering webs 84 are removed, the ends of the covering webs 84 are pulled rearwardly under recovering forces from the support wires 90a, 90b, the flexible member 94, and the pressure bearing member 92. Consequently, the portions (extra covering portions) of the covering webs 84, which up till now have been positioned on the surfaces of the protrusions 66, are pulled rearwardly. Thus, the surfaces of the side supports 20 are prevented from wrinkling and becoming poor in appearance.

With the vehicular seat device 10 according to the present embodiment, the support wires 90a, 90b, the pressure bearing member 92, and the flexible member 94 are elastically deformed in order to make the ends of the covering webs 84 displaceable. The ends of the covering webs 84 can be displaced a greater distance than if only the flexible member 94 were elastically deformed. Therefore, the widths of the protrusions 66 can be changed to an increased extent, thereby enhancing the range within which the restraint on the driver can be varied.

According to the present embodiment, the third wires 108 are disposed adjacent to the constricted portion 96 of the pressure bearing member 92. Thus, the third wires 108 or the covering webs 84 can be disposed in respective spaces, which are created on both sides of the constricted portion 96. Therefore, the movable assembly 86 is rendered compact as a whole.

According to the present embodiment, furthermore, if the driver is subjected to a rearward load toward the backrest 18 due to a vehicle collision or the like, the pressure bearing member 92 bears the rearward load toward the backrest 18, whereupon the support wires 90a, 90b become elastically deformed, thereby displacing the backrest 18 and the pressure bearing member 92 rearwardly. Therefore, the impact on the driver is reduced.

An impact absorbing effect on the driver will be described in further detail with reference to FIGS. 7 and 8.

Figure 7:
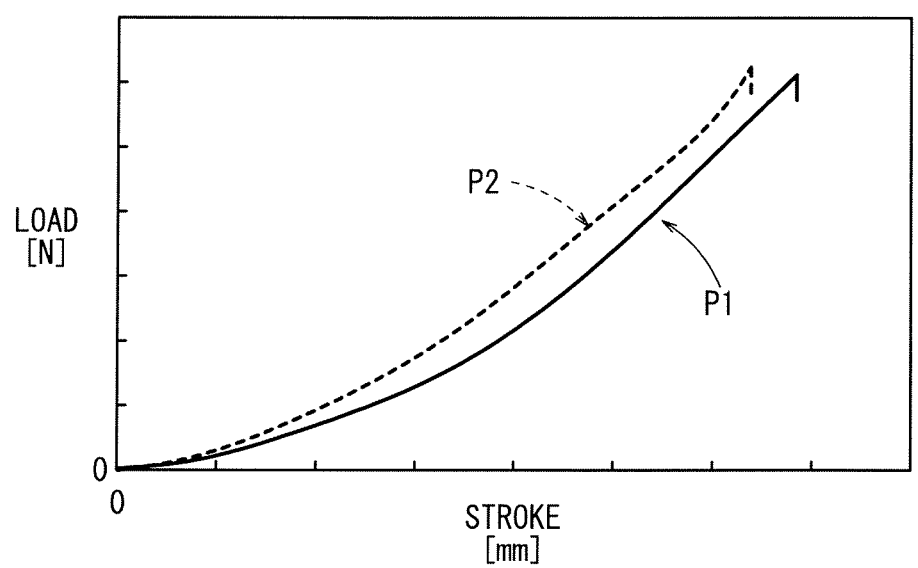
FIG. 7 is a graph showing a relationship between a load acting on a backrest and a rearward stroke of the backrest.

FIG. 7 is a graph showing a relationship between the load that acts on the backrest 18 and the rearward stroke of the front surface of the backrest 18. In the graph, the solid-line curve P1 represents data that was plotted when the first seat device 10 was used, whereas the broken-line curve P2 represents data that was plotted when a vehicular seat device 200 (see FIG. 8) according to a comparative example was used.

FIG. 7 shows data obtained when an experiment was conducted on the vehicular seat device (comparative seat device) 200 according to the comparative example and the first seat device 10, in order to measure relative positional changes of the front surfaces of the backrests 18 when a given static load was applied to the front surfaces of the backrests 18 with the backrests 18 being oriented in a horizontal position (i.e., with the seat devices 200, 10 being tilted 90°).

Structural details of the comparative seat device 200 will be described below with reference to FIG. 8. Only certain details of the comparative seat device 200, which differ from those of the first seat device 10, will be described below. In FIG. 8, which corresponds to FIG. 3, constituent parts that are identical to those shown in FIG. 3 are denoted using identical reference characters.

Figure 8:
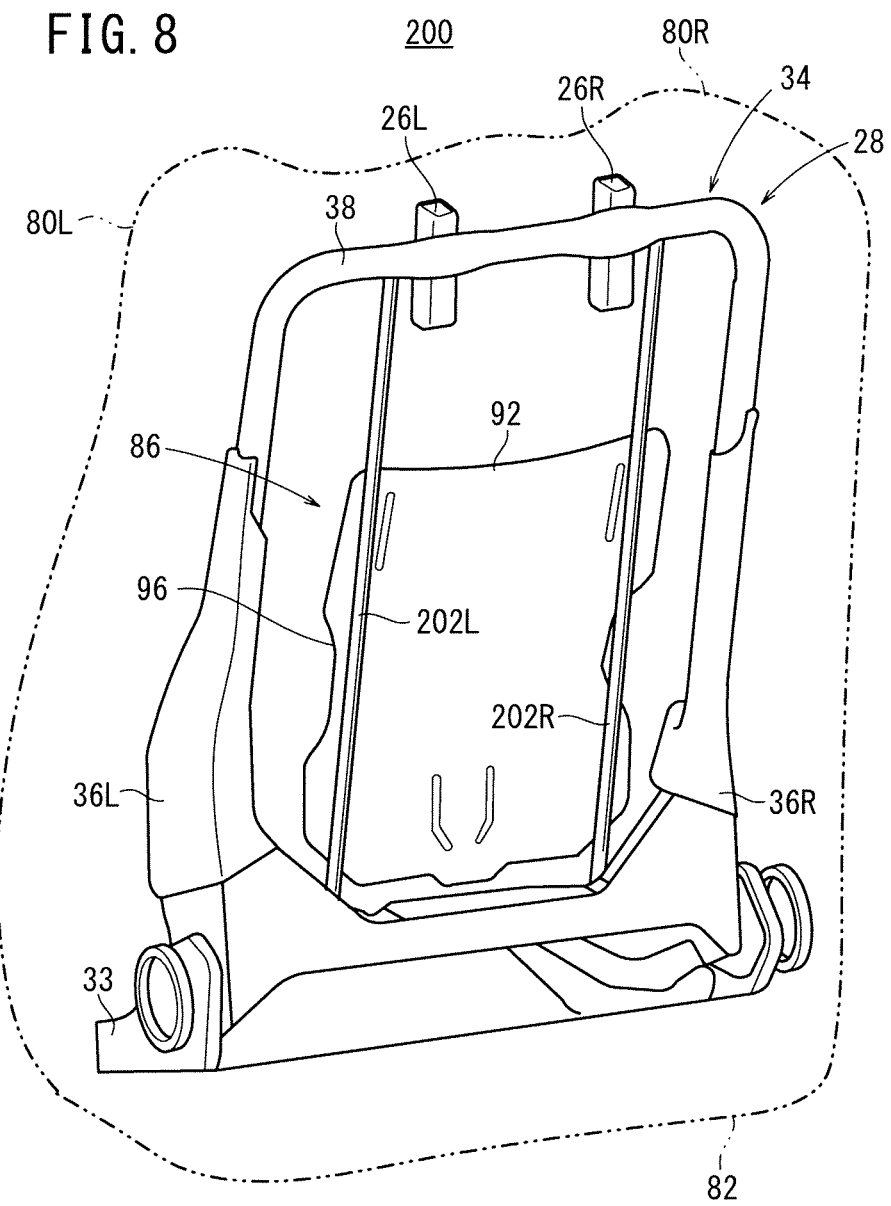
FIG. 8 is a schematic perspective view showing the structure of a vehicular seat device according to a comparative example shown in FIG. 7.

As shown in FIG. 8, the comparative seat device 200 includes fixed members 202L, 202R instead of the flexible member 94 of the first seat device 10. The fixed members 202, which extend vertically, are positioned rearwardly of the pressure bearing member 92. Respective ends of the fixed members 202 are fixed to the top frame member 38, and opposite ends thereof are fixed to the lower portion of the seat back frame 28.

In the experiment that was conducted on the comparative seat device 200, when a static load was imposed on the backrest 18, since the rear surface of the pressure bearing member 92 was brought into contact with the fixed members 202, the backrest 18 was prevented from being displaced rearwardly. On the other hand, the first seat device 10 does not have any member located behind the pressure bearing member 92 that prevents the pressure bearing member 92 from being displaced rearwardly. Accordingly, the stroke over which the backrest 18 of the first seat device 10 was displaced rearwardly is greater than the stroke over which the backrest 18 of the comparative seat device 200 was displaced rearwardly (see FIG. 7).

(Second Embodiment)

A vehicular seat device (second seat device) 300 according to a second embodiment of the present invention will be described below with reference to FIG. 9. Constituent parts of the second embodiment, which are identical to those of the first embodiment, are denoted by identical reference characters, and duplicate descriptions of such parts will be omitted.

Figure 9:
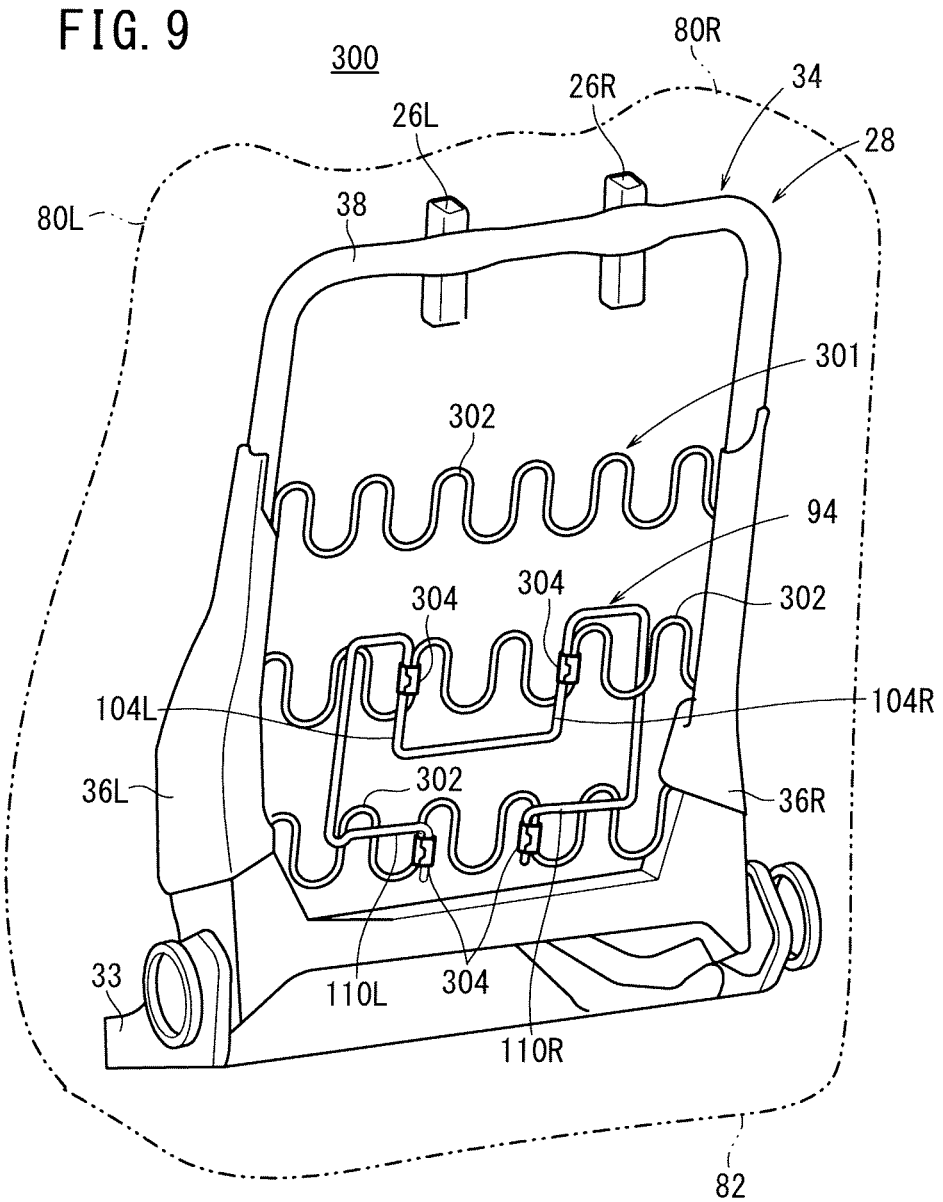
FIG. 9 is a rear perspective view of a frame and a movable member according to a second embodiment of the present invention.

As shown in FIG. 9, the second seat device 300 does not have the support wires 90a, 90b, but has a pressure bearing member 301, which differs in shape from the pressure bearing member 10 of the first seat device 10. More specifically, the pressure bearing member 301 comprises a plurality of (three in FIG. 9) laterally extending S-shaped springs 302. Ends of each of the S-shaped springs 302 are fixed to the side frame members 36. The first wires 104 and the fourth wires 110 of the flexible member 94 are held by clips on two of the S-shaped springs 302. The second embodiment offers the same advantages as those of the first embodiment.

The present invention is not limited to the first and second embodiments, but may be reduced to practice in various other configurations. For example, the central pad and the side pads may be fully separated from each other.

In the vehicular seat device according to the present invention, the flexible member may be dispensed with, and the engaging members may be connected directly to the pressure bearing member. According to such a modification, the ends of the covering webs are displaced as a result of elastic deformation of the support wires and the pressure bearing member.

In the vehicular seat device according to the present invention, furthermore, the airbag device may be disposed outside of one of the side supports. According to such a modification, since a webbing support does not need to be mounted on the frame member, the upper ends of the first wires are not limited in position.

The restraint adjusting mechanism according to the present invention is not limited to using air pouches to change the widths of the protrusions, but may include plates, which are positionally variable with respect to the side frame members in order to change the widths of the protrusions.

The invention claimed is:

1. A vehicular seat device comprising:
   a backrest;
   side supports disposed on respective sides of the backrest and having respective protrusions that project forwardly of the backrest, the side supports including respective covering layers;
   engaging members mounted respectively on the ends of the covering layers, the engaging members extending in one direction;
   means for variably changing widths of the protrusions;
   a frame disposed in the side supports; and
   a movable assembly mounted on the frame and comprising a flexible member which is fixed to the frame, wherein the flexible member includes engaging wires which extend along a direction in which the backrest extends, and which are engaged by the engaging members;
   wherein respective ends of the covering layers are held by the movable assembly for displacement with respect to the frame,
   and wherein the flexible member engages with the ends of the covering layers, and is elastically deformable to displace the ends of the covering layers toward projected ends of the protrusions, as widths of the protrusions are changed.

2. The vehicular seat device according to claim 1, wherein the movable assembly is mounted on the frame for displacement in a thickness-wise direction of the backrest, and is arranged for bearing a rearward load applied to the backrest.

3. The vehicular seat device according to claim 2, wherein the movable assembly further comprises:
   a pressure bearing member held in contact with the backrest.

4. The vehicular seat device according to claim 1, further comprising:
   an airbag unit disposed in one of the side supports, the airbag unit being inflatable outwardly;
   a webbing disposed around the airbag unit; and
   a webbing support held by the frame and supporting the webbing,
   wherein the engaging wires are offset from the webbing support along the direction in which the backrest extends.

5. The vehicular seat device according to claim 4, further comprising a pressure bearing member wherein the pressure bearing member is shaped like a plate and includes a constricted portion, which is narrow in a widthwise direction of the backrest, and the engaging wires are disposed adjacent to the constricted portion.

6. The vehicular seat device according to claim 1, further comprising a pressure bearing member wherein the pressure bearing member is shaped like a plate and includes a constricted portion, which is narrow in a widthwise direction of the backrest, and the engaging wires are disposed adjacent to the constricted portion.

7. A vehicular seat device comprising:
   a backrest;
   side supports disposed on respective sides of the backrest and having respective protrusions that project forwardly of the backrest;
   at least one inflatable pouch member in each of the protrusions for variably changing widths of the protrusions;
   a frame disposed in the side supports; and
   a movable back support assembly mounted on the frame and comprising a pressure-bearing member disposed in the backrest, and a flexible wire member which is attached to the pressure-bearing member, the flexible wire member disposed behind the pressure-bearing member and including two substantially vertically extending engaging wire segments;
   wherein the side supports include respective covering layers, respective ends of the covering layers being held by the movable back support assembly for displacement with respect to the frame,
   and wherein the flexible wire member engages with the ends of the covering layers at the substantially vertically extending segments, and the flexible wire member is elastically deformable to displace the ends of the covering layers forwardly toward projected ends of the protrusions, as widths of the protrusions are changed.

8. The vehicular seat device according to claim 7, further comprising:
   tubular engaging sleeve members mounted respectively on the ends of the covering layers of the side supports, the engaging sleeve members extending in a substantially vertical direction,
   wherein the engaging sleeve members are supported by the substantially vertically extending engaging wire segments of the flexible wire member.

9. The vehicular seat device according to claim 8, wherein the pressure-bearing member includes a constricted portion, which is narrow in a widthwise direction of the backrest, and the engaging wire segments are disposed adjacent to the constricted portion.

10. The vehicular seat device according to claim 7, further comprising:
    an airbag unit disposed in one of the side supports, the airbag unit being inflatable outwardly;
    a webbing disposed around the airbag unit; and
    a webbing support held by the frame and supporting the webbing, wherein the engaging wire segments are offset from the webbing support along the direction in which the backrest extends.

11. The vehicular seat device according to claim 7, wherein the pressure-bearing member includes a constricted portion, which is narrow in a widthwise direction of the backrest, and the engaging wire segments are disposed adjacent to the constricted portion.

* * * * *